US011472554B2

(12) United States Patent
Lutzer

(10) Patent No.: US 11,472,554 B2
(45) Date of Patent: Oct. 18, 2022

(54) AIRCRAFT CABIN ASSEMBLY

(71) Applicant: Airbus Operations GmbH, Hamburg (DE)

(72) Inventor: Wilhelm Lutzer, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 1038 days.

(21) Appl. No.: 15/292,426

(22) Filed: Oct. 13, 2016

(65) Prior Publication Data

US 2017/0101183 A1    Apr. 13, 2017

(30) Foreign Application Priority Data

Oct. 13, 2015 (DE) .......................... 102015117401.4

(51) Int. Cl.
  *B64D 11/00*   (2006.01)
  *G03H 1/18*    (2006.01)
  *G03H 1/22*    (2006.01)

(52) U.S. Cl.
  CPC .......... *B64D 11/0015* (2013.01); *B64D 11/00* (2013.01); *G03H 1/18* (2013.01); *G03H 1/2202* (2013.01); *B64D 2011/0061* (2013.01); *G03H 2001/2231* (2013.01); *G03H 2210/30* (2013.01)

(58) Field of Classification Search
  CPC ........ B64D 11/0015; B64D 2011/0038; B64D 2011/0061; B64D 11/0023
  See application file for complete search history.

(56) References Cited

U.S. PATENT DOCUMENTS 5,455,693 A * 10/1995 Wreede .................... G02B 5/32
                                                       359/15
6,460,806 B2   10/2002 Lau et al.
7,088,310 B2 *  8/2006 Sanford ............. B64D 11/0015
                                                       345/7

(Continued)

FOREIGN PATENT DOCUMENTS

DE         3513919 A1 * 10/1986 ................ B44F 7/00
DE     102007023344       12/2008

(Continued)

OTHER PUBLICATIONS

Wikipedia, "Holography" 2019 (Year: 2019).*

(Continued)

*Primary Examiner* — Richard R. Green
(74) *Attorney, Agent, or Firm* — Jenkins, Wilson, Taylor & Hunt, P.A.

(57) ABSTRACT

An aircraft cabin assembly is depicted and described having a cabin wall, which surrounds a cabin interior space and has a wall surface facing the cabin interior space, and having a light source, which is provided in order to emit light onto the wall surface. The problem of providing an aircraft cabin assembly which, irrespective of the light outside of the aircraft cabin assembly, as effectively as possible gives a passenger in the cabin interior space the impression that the cabin interior space is larger than it actually is, is solved in that the wall surface has a holographic image of an object and in that the light source is designed to emit the kind of light onto the wall surface that allows the holographic image to be seen as a three-dimensional image of the object which is the subject of the holographic image.

14 Claims, 1 Drawing Sheet

(56) References Cited

U.S. PATENT DOCUMENTS

| | | | |
|---|---|---|---|
| 7,782,519 B2* | 8/2010 | Weidner | G02F 1/1533 |
| | | | 359/273 |
| 8,608,317 B2 | 12/2013 | Babst et al. | |
| 8,988,757 B2* | 3/2015 | Weidner | B64C 1/1484 |
| | | | 359/273 |
| 10,321,105 B2* | 6/2019 | McGrew | H04N 9/3185 |
| 2009/0103320 A1 | 4/2009 | Clark | |
| 2009/0229206 A1* | 9/2009 | Christman | B32B 7/12 |
| | | | 52/311.1 |
| 2010/0157615 A1 | 6/2010 | Gruhlke | |
| 2014/0180508 A1 | 6/2014 | Zaneboni | |
| 2015/0008282 A1* | 1/2015 | Boomgaarden | B64D 11/0015 |
| | | | 244/118.5 |
| 2015/0170604 A1* | 6/2015 | Iwagaki | B64D 11/00 |
| | | | 345/589 |
| 2017/0233058 A1* | 8/2017 | Brunaux | B64D 11/003 |
| | | | 244/118.6 |
| 2017/0368860 A1* | 12/2017 | Asano | B41M 5/502 |

FOREIGN PATENT DOCUMENTS

| | | |
|---|---|---|
| DE | 20 2010 017 393 | 1/2012 |
| EP | 1 110 859 | 6/2001 |
| EP | 2 815 973 A1 | 12/2014 |
| EP | 3 156 330 B1 | 6/2018 |

OTHER PUBLICATIONS

European Search Report for European Application No. 16192934 dated Mar. 21, 2017.
German Search Report for Application No. 102015117401 dated Jul. 21, 2016.

* cited by examiner

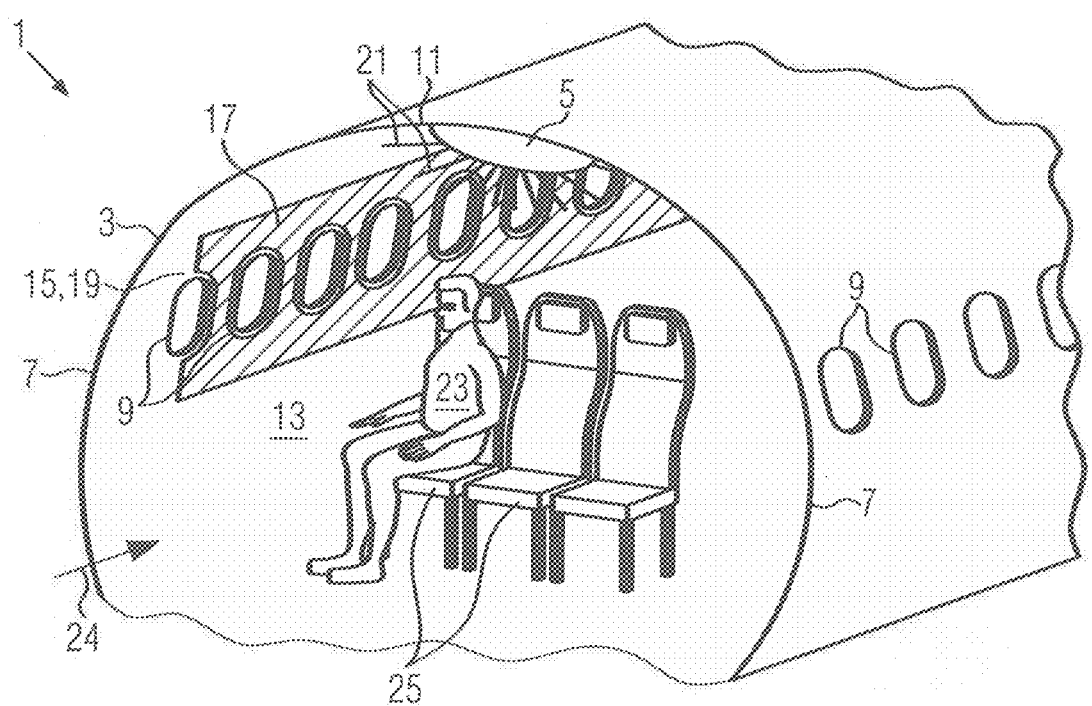

AIRCRAFT CABIN ASSEMBLY

CROSS-REFERENCE TO RELATED APPLICATION

This application claims priority to German Patent Application No. 10 2015 117 401.4 filed Oct. 13, 2015, the entire disclosure of which is incorporated by reference herein.

TECHNICAL FIELD

The present disclosure relates to an aircraft cabin assembly, in particular for passenger aircraft, comprising a cabin wall and a light source. The cabin wall surrounds a cabin interior space and has a wall surface facing the cabin interior space. The cabin wall preferably has opposing side wall sections, in which windows are provided, and a ceiling section. In addition, the cabin wall can have partition sections, for example, class dividers, which partition the cabin interior space in a longitudinal direction of the aircraft cabin assembly. The light source is provided in order to emit or radiate light onto the wall surface. The light source can preferably be a lighting device, such as a ceiling light, for example, or it can be a window, through which light from outside the aircraft cabin assembly enters into the cabin interior space and which may be equipped with a filter.

BACKGROUND

Such aircraft cabin assemblies are known from the prior art. The prior art aircraft cabin assemblies have the disadvantage that, in particular in the case of closely spaced seating, a passenger in the cabin interior space may feel somewhat constricted. Because the actual passenger space in the cabin interior space cannot be changed due to aircraft fuselage diameter limitations, the only option is to change the sense of space experienced by the passengers in the cabin interior space. EP 1 110 859 B1 describes a way to change the sense of space of a passenger, wherein a certain arrangement of mirrors on the windows allows an apparent enlargement of the windows. The impression of larger windows can positively influence a passenger's sense of space in the cabin interior space, but not to the desirable extent and also only when the light outside the aircraft is of a certain kind, which means that it does not work at night, for example.

SUMMARY

An object of the present disclosure is therefore to provide an aircraft cabin assembly which, irrespective of the light outside of the aircraft cabin assembly, as effectively as possible gives a passenger in the cabin interior space the impression that the cabin interior space is larger than it actually is.

This object is achieved in that the wall surface has a holographic image of an object and in that the light source is configured to emit the kind of light onto the wall surface that makes the holographic image visible to passengers in the cabin interior space as a three-dimensional image of the object which is the subject of the holographic image. The holographic image is therefore a hologram, preferably a reflection hologram, which can be designed either as a volume hologram or as a surface hologram. In order for the holographic image to be visible as a three-dimensional image of the object which is the subject of the holographic image, the light which is radiated from the light source onto the wall surface must be defined light, in particular light of the same kind, which is identical to the reference wave when the holographic image is received. This defined light can, however, also be white light, which enters into the cabin interior space through a window, for example.

The three-dimensional image of the object on the wall surface can thus provide a passenger in the cabin interior space with a certain impression of space, whereby the cabin wall is interpreted not as a solid boundary, but rather as a space with a certain depth, so that a passenger's feeling of constriction is reduced. The object which is the subject of the holographic image can vary greatly, provided that it gives a passenger the sense of a large spatial area.

In one preferred embodiment, the object corresponds to the wall surface before the application of the holographic image, so that a three-dimensional image of the wall surface is disposed over the actual wall surface. The holographic image is applied to the wall surface in such a way that the holographic image of the wall surface corresponds to the actual wall surface. This means that corresponding features of the image and of the object are disposed on top of one another, such as a window edge over a window edge, etc.

In some aspects that the holographic image depicts the wall surface in a plane which, viewed from the direction of the cabin interior space, lies behind the plane of the actual wall surface in which the holographic image is disposed. A passenger in the cabin interior space thus perceives the wall surface to be at a greater distance than it actually is in order to thus give the passenger a broader, less restricted sense of space. With such a subject for the holographic image, nothing is changed regarding the actual form of the wall surface, the impression is merely created that it is at a greater distance, which means that the cabin interior space appears larger.

According to an alternative embodiment, the object is a landscape with a horizon or a sea with a horizon. Alternatively, the subject can also be a forest, a beach, or a clouded sky. The subjects, in other words, the objects, are preferably selected such that they are suited to a particular airline or their passenger category, for example. All of these subjects, or objects, give passengers a sense of a large spatial area.

According to some embodiments, the holographic image is provided on the wall surface of a side wall section of the cabin wall, preferably on the wall surface of both opposing side wall sections. The cabin interior space thus appears wider than it actually is.

Simultaneously or alternatively, the holographic image is provided on the wall surface of a ceiling section of the cabin wall. The cabin interior space thus appears higher than it actually is.

Simultaneously or alternatively, the holographic image is provided on the wall surface of a partition section of the cabin wall, in particular of a class divider for separating the different seating classes. In this case, it is preferred that the holographic image depicts the wall surface in a plane which, viewed from the direction of the cabin interior space, lies in front of the plane of the actual wall surface in which the holographic image is disposed, so that the aircraft cabin assembly thus appears shorter to a passenger.

Another aspect of the present disclosure relates to a method for virtual, i.e. perceived, spatial enlargement of an aircraft cabin assembly. The method comprises the following steps:

Firstly, an aircraft cabin assembly according to one of the exemplary embodiments described above, having a cabin wall and a light source, is provided. The cabin wall surrounds a cabin interior space and has a wall surface facing the cabin interior space. The light source emits light onto the wall surface and can be designed either as a lighting device, such as a ceiling light, for example, or as a window, optionally having an additional filter for providing the required defined light.

A holographic image, in other words a hologram, in particular a reflection hologram, of an object is then recorded, which conveys a spatial width or depth, such as a landscape or a sea with a horizon, a forest, a beach or a clouded sky, for example. The object is illuminated with an object wave and a holographic film is simultaneously illuminated with a reference wave.

As the next step, the holographic image is applied to the wall surface, in other words, stuck to the wall surface, for example.

Finally, the holographic image on the wall surface is illuminated by the light source with the kind of light that allows the holographic image to be seen by passengers in the cabin interior space as a three-dimensional image of the object. The light is a defined light, in particular light of the same kind, which is identical to the reference wave when the holographic image is recorded, with white light also being possible.

In this way, a three-dimensional image of an object is generated on the wall surface which, due to the subject and due to the three-dimensionality, gives a passenger in the cabin interior space the sense that the cabin interior space is larger than it actually is.

According to a preferred embodiment, the object corresponds to the wall surface before application of the holographic image. The wall surface is recorded from a position in the cabin interior space which is preferably further away from the wall surface than the passenger seats provided beside the wall surface. That means that the wall surface is illuminated with an object wave and a holographic film is simultaneously illuminated with a reference wave, with the holographic film being disposed in a position in the cabin interior space that is at a spacing to the wall surface, and is preferably further away from the wall surface than the passenger seats provided beside the wall surface. The recorded wall surface must not necessarily be identical to the wall surface on which the holographic image is subsequently applied, it can also be a comparable wall surface, such as that of an exemplary aircraft cabin assembly, for example.

The holographic image is preferably applied to the wall surface in such a way that the holographic image of the wall surface corresponds to the actual wall surface.

The holographic image on the wall surface is preferably also illuminated with the kind of light that allows the holographic image to be seen by passengers in the cabin interior space as a three-dimensional image of the wall surface, with the image of the wall surface preferably lying in a plane which, viewed from the direction of the cabin interior space, lies behind the plane of the actual wall surface in which the holographic image is disposed.

BRIEF DESCRIPTION OF THE DRAWINGS

An exemplary embodiment of the aircraft cabin assembly according to the disclosure herein is explained in greater detail below with reference to a drawing, in which FIG. 1 shows a perspective sectional view through an aircraft cabin assembly according to the disclosure herein.

DETAILED DESCRIPTION

FIG. 1 depicts an exemplary embodiment of the aircraft cabin assembly 1 according to the disclosure herein. The aircraft cabin assembly 1 comprises a cabin wall 3 and a light source 5. The cabin wall 3 comprises two opposing side wall sections 7 with windows 9 provided therein and a ceiling section 11, which together surround a cabin interior space 13. The cabin wall 3 has a wall surface 15 facing the cabin interior space 13. A holographic image 17 of an object 19 is provided on the wall surface 15. In this exemplary embodiment, the light source 5 is in the form of a ceiling light and configured to illuminate the holographic image 17 on the wall surface 15. The light source 5 radiates the kind of light 21 onto the holographic image 17 on the wall surface 15 that allows the holographic image 17 to be seen by passengers 23 in the cabin interior space 13 as a three-dimensional image of the object 19 which is the subject of the holographic image 17. The light 21 required for this purpose is the same kind of light, which is identical to the reference wave when the holographic image 17 is recorded.

In this exemplary embodiment, the object 19 which is the subject of the holographic image 17 corresponds to the wall surface 15 before application of the holographic image 17, so that the three-dimensional image of the wall surface 15 appears over the actual wall surface 15. In particular, the holographic image 17 depicts the wall surface 15 in a plane which, viewed from the direction of the cabin interior space 13, lies behind the plane of the actual wall surface 15 in which the holographic image 17 is disposed. The wall surface 15 is thus visible to a passenger 23 in the cabin interior space 13 at a greater distance than it actually is in order to thus give a passenger 23 the impression of a larger cabin interior space 13.

Alternative objects, which also give a passenger 23 in the cabin interior space 13 the impression of a large space or reduce the impression of constricted space in the cabin interior space 13 are, for example, a horizon with a landscape or with a sea, a forest, a beach or a clouded sky.

In this exemplary embodiment, the holographic image 17 is provided on the wall surface 15 of the opposing side wall sections 7 of the cabin wall 3 in a continuous manner in a longitudinal direction 24 of the aircraft cabin assembly 1, in other words, between the windows 9 and around the windows 9. Alternatively, the holographic image 17 can however also be provided on the wall surface 15 of the ceiling section 11 or of a partition section (not shown) of the cabin wall 3.

In order to give a passenger in the cabin interior space 13 the impression that the cabin interior space 13 is larger than it actually is, the following steps are carried out. Firstly, an aircraft cabin assembly 1, as described above, is provided. A holographic image 17 of the wall surface 15 is then recorded from a certain position in the cabin interior space 13. This recorded wall surface 15 can be, but does not necessarily have to be, identical to the wall surface 15 onto which the holographic image 17 is subsequently applied. It can also be a comparable wall surface 15, for example, an exemplary aircraft cabin assembly. The wall surface 15 is recorded from a position in the cabin interior space 13 that is further away from the wall surface 15 than the passenger seats 25 provided beside the wall surface 15. In other words, the wall surface 15 is illuminated with an object wave and, simultaneously, a holographic film (not shown) is illuminated with a reference wave, with the holographic film being disposed in a position in the cabin interior space 13 that is at a spacing to the wall surface 15, and in particular that is further away from the wall surface 15 than the passenger seats 25 provided beside the wall surface 15.

The holographic image 17 is then applied to the wall surface 15, with the holographic image 17 of the wall surface 15 corresponding to the actual wall surface 15. The holographic image 17 on the wall surface 15 is subsequently illuminated by the light source 5 with light 21 that corresponds to the reference wave when the holographic image 17 is recorded. The holographic image 17 can thus be seen by passengers 23 in the cabin interior space 13, in particular when they are in the passenger seats 25 area, as a three-dimensional image of the wall surface 15, with the image of the wall surface 15 lying in a plane which, viewed from the direction of the cabin interior space 13, lies behind the plane of the actual wall surface 15 in which the holographic image 17 is disposed. A passenger 23 in the cabin interior space 13 is thus given the impression that the opposing side wall sections 7 of the cabin wall 3 are further away from one another and that the cabin interior space 13 is thus larger than it actually is.

While at least one exemplary embodiment of the present invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft cabin assembly comprising:
   a cabin wall, which surrounds a cabin interior space and has a wall surface facing the cabin interior space;
   a first recorded holographic image of a first object, the first recorded holographic image being applied onto the wall surface of the cabin wall;
   a class divider, which partitions the cabin interior space in a longitudinal direction of the aircraft cabin assembly and has a wall surface facing the cabin interior space;
   a second recorded holographic image of a second object, the second recorded holographic image being applied onto the wall surface of the class divider; and
   a light source;
   wherein the first object is a subject of the first recorded holographic image and the second object is a subject of the second recorded holographic image;
   wherein the light source is configured to illuminate the first recorded holographic image with light that corresponds to a reference wave of lighting of the first recorded holographic image when the first recorded holographic image was recorded, such that the first recorded holographic image appears to occupants of the cabin interior space as a three-dimensional image of the first object;
   wherein, when the first recorded holographic image is illuminated with the light emitted onto the first recorded holographic image by the light source and is viewed from within the cabin interior space, the first object shown in the first recorded holographic image is configured to appear to the occupants of the cabin interior space to be located in a plane that is behind a plane in which the wall surface of the cabin wall, to which the first recorded holographic image is applied, is actually located;
   wherein the light source is configured to illuminate the second recorded holographic image with light that corresponds to a reference wave of lighting of the second recorded holographic image when the second recorded holographic image was recorded, such that the second recorded holographic image appears to the occupants of the cabin interior space as a three-dimensional image of the second object; and
   wherein, when the second recorded holographic image is illuminated with the light emitted onto the second recorded holographic image by the light source and is viewed from within the cabin interior space, the second object shown in the second recorded holographic image is configured to appear to the occupants of the cabin interior space to be located in a plane that in front of a plane in which the wall surface of the class divider, to which the second recorded holographic image is applied, is actually located.

2. The aircraft cabin assembly according to claim 1, wherein:
   the first recorded holographic image of the first object corresponds to the wall surface of the cabin wall before application of the first recorded holographic image to the wall surface of the cabin wall; and/or
   the second recorded holographic image of the second object corresponds to the wall surface of the class divider before application of the second recorded holographic image to the wall surface of the class divider.

3. The aircraft cabin assembly according to claim 1, wherein the first recorded holographic image of the first object corresponds to a landscape with a horizon or to a sea with a horizon.

4. The aircraft cabin assembly according to claim 1, wherein the first recorded holographic image of the first object corresponds to a forest.

5. The aircraft cabin assembly according to claim 1, wherein the first recorded holographic image of the first object corresponds to a beach.

6. The aircraft cabin assembly according to claim 1, wherein the first recorded holographic image of the first object corresponds to a clouded sky.

7. The aircraft cabin assembly according to claim 1, wherein the cabin wall comprises a side wall section, onto which the first recorded holographic image is applied.

8. The aircraft cabin assembly according to claim 1, wherein the cabin wall comprises a ceiling section, onto which the first recorded holographic image is applied.

9. The aircraft cabin assembly according to claim 1, wherein the first recorded holographic image is provided in a continuous manner on the wall surface in the longitudinal direction of the aircraft cabin assembly.

10. The aircraft cabin assembly according to claim 1, wherein the first and/or second recorded holographic images are formed by a reflection hologram.

11. The aircraft cabin assembly according to claim 1, wherein the light source comprises a ceiling light and/or a window.

12. A method for virtual spatial enlargement of an aircraft cabin assembly, the method comprising:
   providing a cabin wall within the aircraft cabin assembly, wherein the cabin wall surrounds a cabin interior space and has a wall surface facing the cabin interior space;
   recording a first holographic image of a first object;
   applying the first holographic image onto the wall surface of the cabin wall;
   providing a class divider within the aircraft cabin assembly, wherein the class divider partitions the cabin interior space in a longitudinal direction of the aircraft cabin assembly and has a wall surface facing the cabin interior space;

recording a second holographic image of a second object;

applying the second holographic image onto the wall surface of the class divider;

illuminating the first holographic image with light that corresponds to a reference wave of lighting of the first holographic image when the first holographic image was recorded, such that the first holographic image appears to occupants of the cabin interior space as a three-dimensional image of the first object; and illuminating the second holographic image with light that corresponds to a reference wave of lighting of the second holographic image when the second holographic image was recorded, such that the second holographic image appears to the occupants of the cabin interior space as a three-dimensional image of the second object:

wherein, when the first holographic image is illuminated with the light emitted onto the first holographic image and is viewed from within the cabin interior space, the first object shown in the first holographic image appears to the occupants of the cabin interior space to be located in a plane that is behind a plane in which the wall surface of the cabin wall, to which the first recorded holographic image is applied, is actually located; and wherein, when the second holographic image is illuminated with the light emitted onto the second holographic image and is viewed from within the cabin interior space, the second object shown in the second holographic image appears to the occupants of the cabin interior space to be located in a plane that is in front of a plane of in which the wall surface of the class divider, to which the second holographic image is applied, is actually located.

13. The method according to claim 12, wherein:

the first holographic image of the first object corresponds to the wall surface of the cabin wall before application of the first holographic image to the wall surface of the cabin wall; and/or wherein the second holographic image of the second object corresponds to the wall surface of the class divider before application of the second holographic image to the wall surface of the class divider.

14. A method for virtual spatial enlargement of an aircraft cabin assembly, comprising:

providing a cabin wall within the aircraft cabin assembly, wherein the cabin wall surrounds a cabin interior space and has a wall surface facing the cabin interior space;

applying a first holographic image of a first object onto the wall surface of the cabin wall;

providing a class divider within the aircraft cabin assembly, wherein the class divider partitions the cabin interior space in a longitudinal direction of the aircraft cabin assembly and has a wall surface facing the cabin interior space;

applying the second holographic image onto the wall surface of the class divider;

illuminating the first holographic image with light that corresponds to a reference wave of lighting of the first holographic image when the first holographic image was recorded, such that the first holographic image appears to occupants of the cabin interior space as a three-dimensional image of the first object; and illuminating the second holographic image with light that corresponds to a reference wave of lighting of the second holographic image when the second holographic image was recorded, such that the second holographic image appears to the occupants of the cabin interior space as a three-dimensional image of the second object:

wherein, when the first holographic image is illuminated with the light emitted onto the first holographic image and is viewed from within the cabin interior space, the first object shown in the first holographic image appears to the occupants of the cabin interior space to be located in a plane that is behind a plane in which the wall surface of the cabin wall, to which the first recorded holographic image is applied, is actually located; and wherein, when the second holographic image is illuminated with the light emitted onto the second holographic image and is viewed from within the cabin interior space, the second object shown in the second holographic image appears to the occupants of the cabin interior space to be located in a plane that is in front of a plane in which the wall surface of the class divider, to which the second holographic image is applied, is actually located.

* * * * *